Aug. 15, 1939.   E. McCORMICK   2,169,449
TRACTOR
Filed July 29, 1937

WITNESS-
Norman E. Westling

INVENTOR
ELMER McCORMICK
BY
ATTORNEYS

Patented Aug. 15, 1939

2,169,449

UNITED STATES PATENT OFFICE 2,169,449

TRACTOR

Elmer McCormick, Waterloo, Iowa, assignor to John Deere Tractor Company, Waterloo, Iowa, a corporation of Iowa Application July 29, 1937, Serial No. 156,383

2 Claims. (Cl. 180—1)

The present invention relates to tractors and more particularly to a tractor body adapted for work in orchards where the tractor must be driven through and under low hanging branches without injuring them.

Many so-called "stream-lined" tractors have been designed for orchard work in which the motor and body have been hooded and the wheels covered by fenders. In most of these there are still many protuberances and leading edges that tend to catch on branches or to bruise the fruit that is hanging therefrom.

The main object of the present invention, therefore, is to provide a tractor body in which all surfaces liable to come in contact with low hanging, fruit laden branches, are smooth and continuous, permitting the branches to slide over without bumping or catching.

Another object is to provide fenders covering the large driving wheels, and having forwardly extending portions converging toward the body at a point near the front end, for the purpose of guiding branches to the side, out of the way of the wheels.

These and other objects and advantages of my invention will be apparent after a consideration of the following detailed description of a specific embodiment of my invention, in which reference is made to the drawing appended hereto, in which—

Figure 1:
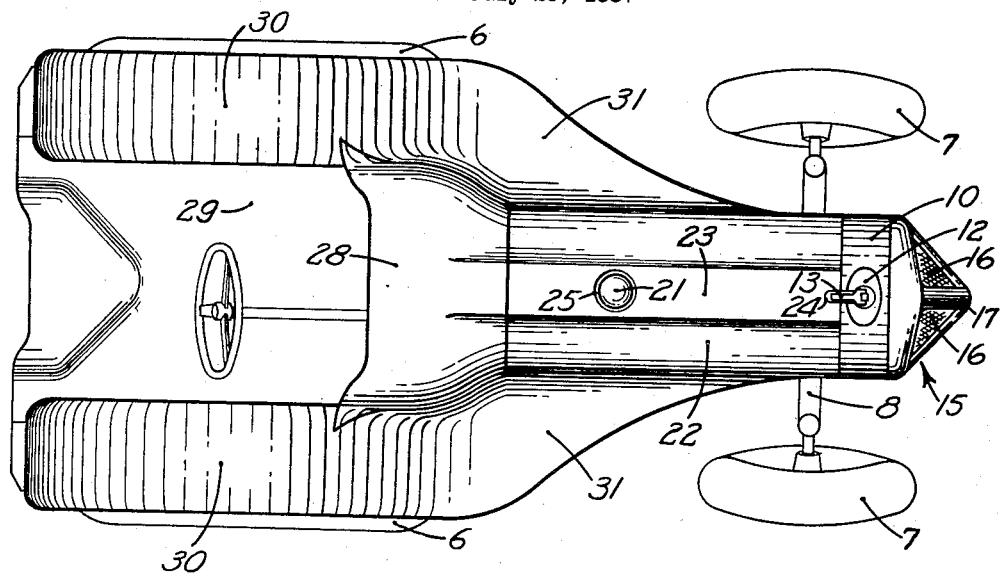
Figure 1 is a plan view of an orchard tractor embodying the principles of my invention.
Figure 2:
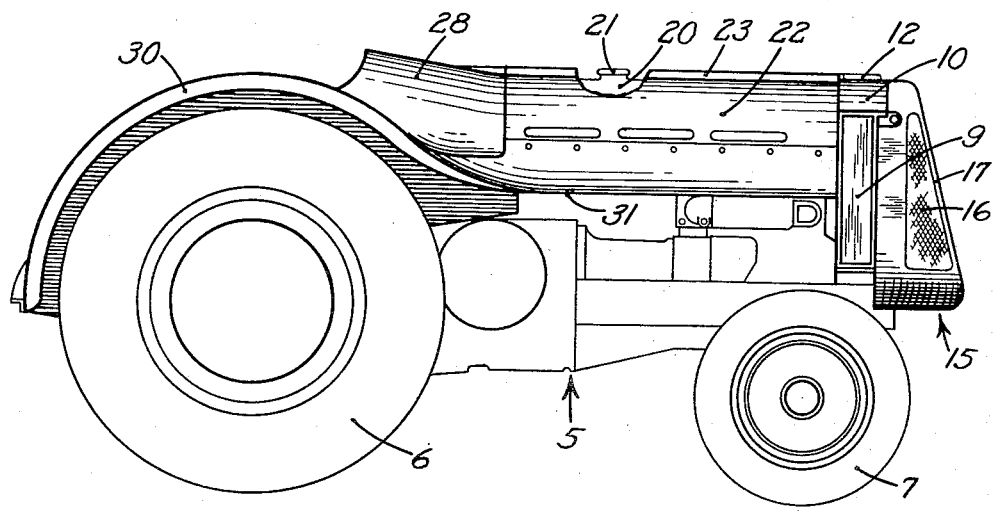
Figure 2 is a side elevation of the same tractor but with a portion of the hood cut away to show more clearly the relation of the fuel tank filler cap with the raised portion of the hood in which it is recessed.

The tractor on which my invention is illustrated is of the small, low-built variety comprising a body 5, a pair of laterally spaced driving wheels 6 disposed on opposite sides of the body at the rear, and a pair of laterally spaced dirigible wheels 7 disposed near the forward end of the body and mounted on a transversely extending front axle 8.

Mounted on the front end of the body 5 just ahead of the axle 8 is a radiator 9 extending across the width of the body in a vertical transverse plane. The top portion 10 of the radiator is curved across from side to side providing a gradual transition from the horizontal top surface to the vertical sides. Located in the center of the top portion 10 and raised slightly above the surface is a radiator filler cap 12. A locking lever 13, pivotally connected to the filler cap for swinging movement in a vertical plane, provides a handle for screwing the cap on or backing it off.

Continuing forward from the radiator 9, is a wedge-shaped grille 15 having two panels 16 of foraminous material separated by a rib 17 extending vertically and rearwardly from the base and forming the leading edge. The purpose of this grille is to push low hanging branches to either side without subjecting them to the solid impact that would result if struck by the flat surface of the radiator. The two panels 16 permit air to flow freely through to the radiator for cooling the motor. The base of the grille 15 is curved under, while the outer edges adapt themselves to the contour of the radiator.

Disposed to the rear of the radiator 9 is a fuel tank 20 having a filler cap 21 extending above the surface to the same level as the radiator filler cap 12 and in longitudinal alignment with it.

Extending rearwardly from the radiator 9, 10 and flush with it, is a hood 22 reaching part way down the sides to cover the top portion of the tractor body 5. Down the center of the top of the hood is a longitudinally extending raised portion 23, the top surface of which is flush with the raised radiator cap 12 and the fuel tank cap 21. A notch 24 in the raised portion 23 holds the locking lever 13 on the radiator filler cap in position. The fuel tank filler cap 21 is set within an aperture 25 in the hood, making a substantially uninterrupted plane surface on the top of the raised portion 23.

At its rear end, the hood is flared slightly to form a cowl 28 behind which the operator sits. The raised portion 23 of the hood merges into the cowl.

Curving over the rear driving wheels from front to rear and extending down on the insides of the wheels to the horizontal platform 29 on which the operator rides, are fenders 30. The forward portions 31 of the fenders are extended horizontally forward, merging with the sides of the hood 22. The outer edges of the horizontal extensions 31 converge with the sides of the hood at points near the forward end of the hood, above the front axle 8, acting as sweeps to brush low hanging branches to the sides of the fenders.

From the foregoing description and the appended drawing, it will be seen that a tractor embodying the principles of my invention can be driven through the low hanging fruit or blossom laden branches of fruit trees without injuring them because of the gentle, guiding action of the wedge-shaped radiator grille and fender sweeps in pushing the branches to the side. Fruit that is dragged over the top or along the sides of the hood is not bruised because the smooth surface of the hood offers no resistance and there are no projections against which it might strike.

What I claim is:

1. In an orchard tractor having a body and a pair of laterally spaced wheels supporting the rear end thereof, a radiator disposed near the forward end of said body, a filler cap extending above the outside surface of said radiator, a fuel tank disposed to the rear of said radiator and having a filler cap spaced rearwardly and at the same level with said radiator filler cap, a streamline casing for protecting orchard trees from injury by said tractor, said casing comprising a longitudinally extending hood mounted on said body flush with said radiator, a raised portion on said hood extending between and flush with said radiator filler cap and said fuel tank filler cap, and fenders for said wheels, said fenders being disposed circumjacent to said wheels and extending horizontally forward beyond the wheels and adjacent to said hood, the outer edges of said horizontal forward extensions converging inwardly and merging with the sides of said hood, said fenders and hood providing smooth, continuous surfaces and edges for guiding low hanging branches out of the way without injury thereto.

2. For use with an orchard tractor having a body supported on front and rear wheels, a radiator disposed near the forward end of said body, a filler cap extending above the outside surface of said radiator, and a fuel tank disposed to the rear of the radiator and having a filler cap spaced rearwardly and at the same level with said radiator filler cap, a streamline casing for protecting orchard trees from injury by said tractor, said casing comprising a V-shaped radiator shield disposed in front of said radiator with its sides converging forwardly and sloping upwardly and rearwardly for parting the low hung branches and for raising them over the radiator as the tractor moves forwardly, a longitudinally extending hood mounted on said body flush with said radiator, a raised portion on said hood extending between and flush with said radiator filler cap and said fuel tank filler cap for supporting the branches as the tractor moves thereunder, and fenders for said rear wheels, said fenders being disposed circumjacent to said wheels and extending horizontally forward beyond the wheels and adjacent to said hood, the outer edges of said forward extensions converging inwardly and merging with the sides of said hood, said fenders acting to gently part the branches still further and to hold them outside of said rear wheels until the tractor has passed.

ELMER McCORMICK.